United States Patent [19]

Torkko

[11] 4,177,600
[45] Dec. 11, 1979

[54] ANIMAL TRAP

[76] Inventor: Reino Torkko, P.O. Box 478, Longlac, Canada, P0T 2A0

[21] Appl. No.: 869,607

[22] Filed: Jan. 16, 1978

[51] Int. Cl.² .................. A01M 23/30; A01M 23/26
[52] U.S. Cl. .......................................... 43/82; 43/93
[58] Field of Search .............. 43/77, 81, 82, 88, 90, 43/92, 93

[56] References Cited

U.S. PATENT DOCUMENTS

| 928,779 | 7/1909 | Miller | 43/82 |
|---|---|---|---|
| 1,443,244 | 1/1923 | Wirum | 43/93 |
| 1,939,190 | 12/1933 | Terry | 43/88 |
| 3,106,036 | 10/1963 | Lehn | 43/93 |
| 3,932,955 | 1/1976 | Desrosiers | 43/81 |
| 3,950,884 | 4/1976 | Desrosiers | 43/81 |
| 3,991,509 | 11/1976 | Frost | 43/90 |

*Primary Examiner*—Nicholas P. Godici
*Assistant Examiner*—K. Bradford Adolphson
*Attorney, Agent, or Firm*—Stanley G. Ade

[57] ABSTRACT

A rectangular frame base acts as a lower jaw and is provided with a pair of upper frame type jaws pivoted centrally of the base frame. A hair-pin type spring is engaged around one side of the base and operatively engages the upper frames between same normally urging them from a set position at which position they are substantially perpendicular to the base, to a sprung position at which position they lie substantially upon the base frame. A cruciform trigger assembly is pivotally supported upon one upper jaw and may be detachably engaged with the upper jaw to hold the upper jaws in the substantially spaced and parallel position relative to one another in the set position. The trigger is sprung by movement of same parallel to the base frame or downwardly towards the base frame.

6 Claims, 5 Drawing Figures

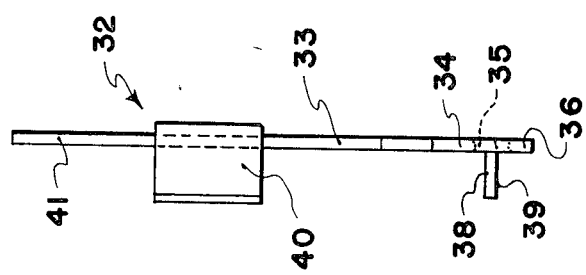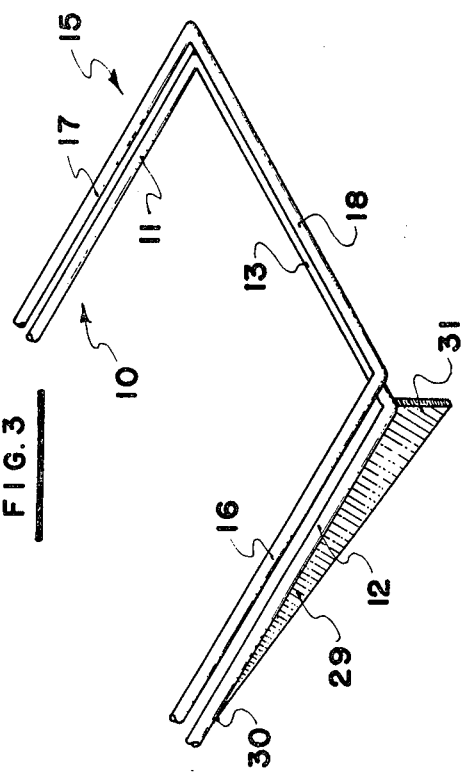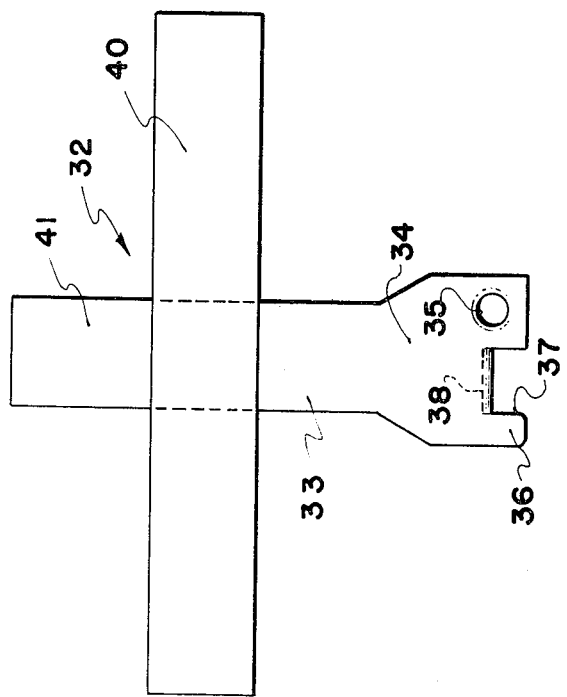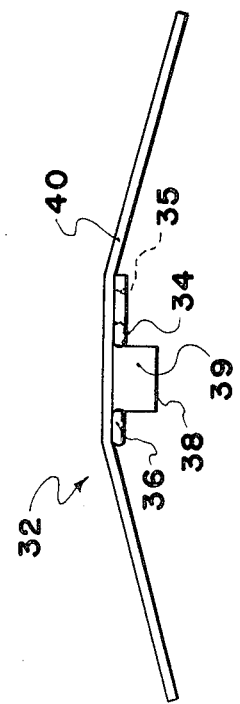

ANIMAL TRAP

BACKGROUND OF THE INVENTION

This invention relates to new and useful improvements in animal traps, particularly animal traps which rely upon a relatively heavy duty spring to urge a pair of jaws together when the trap is sprung.

Conventional traps of this nature are relatively inhuman and often consist of what is known as "leg traps."

SUMMARY OF THE INVENTION

The present trap is designed specifically to be more humane and to inflict a crushing blow to the head or upper body region of the animal when the trap is sprung, thereby killing it as quickly and as humanely as possible.

One aspect of the invention consists of an animal trap comprising in combination a lower jaw assembly, an upper jaw assembly pivoted by the lower ends thereof to said lower jaw assembly and movable from a set position substantially perpendicular to said lower jaw assembly, to a sprung position substantially superimposed upon said lower jaw assembly and vice-versa, spring means operatively connected between said upper and lower jaw assemblies normally urging said upper jaw assembly towards the sprung position, and a trigger assembly for said upper jaw assembly, said trigger assembly maintaining said upper jaw assembly in the set position against the pressure of said spring means, when in the upper jaw engaging position, and releasing said upper jaw assembly to the sprung position when disengaged from said upper jaw assembly.

Another advantage of the invention is that it is relatively simple in operation, economical in manufacture and otherwise well suited to the purpose for which it is designed.

With the foregoing in view, and other advantages as will become apparent to those skilled in the art to which this invention relates as this specification proceeds, my invention consists essentially in the arrangement and construction of parts all as hereinafter more particularly described, reference being had to the accompanying drawings in which:-

DESCRIPTION OF THE DRAWINGS

FIG. 2 is a top plan view of the trigger assembly per se.

FIG. 3 is an end view of FIG. 2.

FIG. 4 is a front view of FIG. 2.

FIG. 5 is a fragmentary isometric view of one of the upper jaws shown in the sprung position relative to one end of the lower jaw.

In the drawings like characters of reference indicate corresponding parts in the different figures.

DETAILED DESCRIPTION

Figure 1:
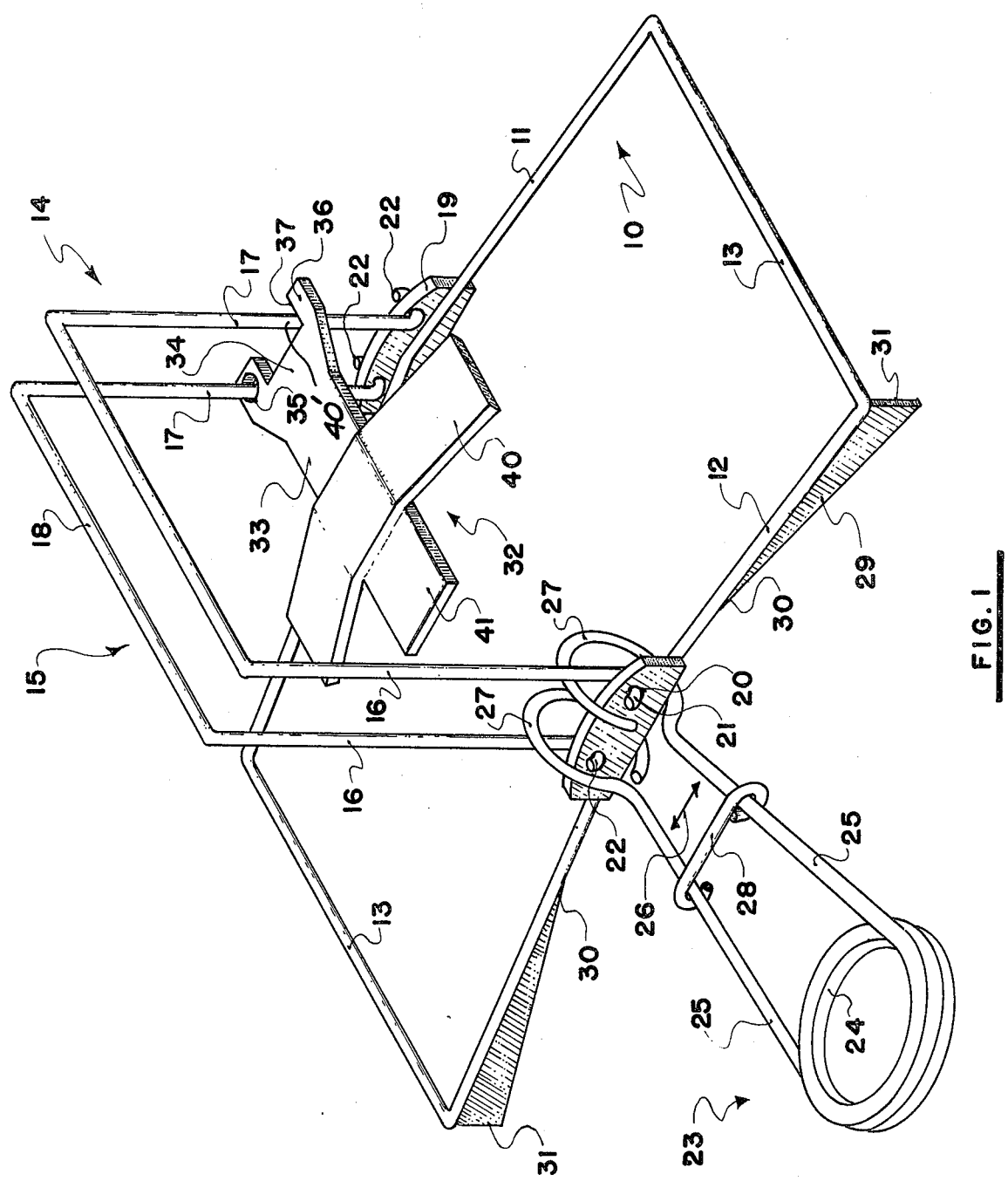
FIG. 1 is an isometric view of the trap shown in the set position but with a spring safety catch engaged.

Proceeding therefore to describe the invention in detail, reference character 10 illustrates the lower jaw assembly which, in this embodiment, comprises a substantially rectangular open frame preferably formed from round mild steel stock or the like and including a pair of spaced and parallel longitudinally extending members 11 and 12, and a pair of transversely extending end members 13 extending between the adjacent ends of the members 11 and 12 as clearly shown.

An upper jaw assembly provided collectively designated 14 which, in this embodiment, includes a pair of open three-sided frames, each frame including a pair of spaced and parallel side members 16 and 17 together with an outer transversely extending member 18 extending between the adjacent ends of the side members 16 and 17, all of which are clearly illustrated in FIG. 1. Once again these are preferably manufactured from round mild steel stock.

Means are provided to pivot the frames to the base frame or lower jaw assembly 10 and in this embodiment, hinge plates 19 are welded centrally of the longitudinally extending members 11 and 12 and extend upwardly therefrom as clearly shown in FIG. 1. These hinge plates are apertured as at 20 to receive in a pivotal manner, outturned ends 21 of the distal ends of the side members 16 and 17 of the upper jaw frame 15 so that these upper jaw frames may pivot from the spaced and parallel set position shown in FIG. 1 to the superimposed or sprung position partially illustrated in FIG. 5.

The out-turned ends 21 are preferably then turned at right angles as illustrated by reference character 22 so that these ends are substantially U-shaped in order to retain same within the hinge plates 19.

Spring means collectively designated 23 are provided which, in this embodiment, consist of a spring assembly which includes a plurality of coils 24 having arms 25 extending from the ends of the coils as clearly shown. Spring steel is used for the manufacture of the spring assembly and the formation thereof is such that the arms are normally urged apart in the direction of double-headed arrow 26, by the action of the coil 24.

The distal ends of the arms 25 terminate in eye or loop portions 27 which freely engage around the longitudinally extending side member 12 of the base frame and are large enough to freely engage around the spring plates 19. These eye portions 27 are situated between the upper jaws 15 as clearly shown so that these eye portions normally urge the jaws to the sprung position under the influence of the coil 24. A spring safety catch 28 may detachably engage over the arms 25 to hold the trap in the set position illustrated in FIG. 1, while same is being placed in position.

Spring retainers in the form of wedge plates 29 are provided on the underside of the longitudinally extending member 12 and take the form of wedge plates which are welded one upon each side of the center of the member 12 as clearly shown. These wedge plates increase in thickness from the inner ends 30 thereof towards the outer ends 31 which are situated adjacent the transverse members 13 of the base frame.

These are provided for two reasons. Firstly, as the eyes or loops 27 move apart when the trap is sprung, the loops are guided downwardly to utilize the spring's full power, particularly towards the end of the stroke thereby facilitating the deliverance of a killing blow to an entrapped animal.

Secondly, the wedge plates elevate the spring side of the trap, namely longitudinally extending portion 12, clear of the ground in such a manner as to prevent the spring arms from contacting the ground. This reduces the possibility of any ground debris interfering with the action of the spring during the releasing movement.

Also to be noted is the fact that the transverse members or portions 18 of the upper jaws are situated beyond the transverse members 13 of the lower jaws or frame when in the sprung position as clearly shown in FIG. 5. This gives an upper jaw construction in which the reach thereof is greater than the lower jaw. This arrangement forms a better grip over the animal when it is trapped and it will be appreciated that different animal sizes require adjustment of jaw reach and overlap to be effective.

A trigger assembly is provided collectively designated 32. It consists of a substantially rectangular plate component 33 widening at the outer end 34 thereof and being apertured as at 35 to freely engage over the vertical or outer member 17 of one of the upper jaws 15.

A lug 36 is formed on the other side of the plate adjacent the end 34 thereof and this lug engages around the portion 17 of the other of upper jaws 15 when in the set position. It will therefore be appreciated that when the spring safety catch 28 is released, pressure of the spring 23 forces the two frames apart with the portion 17 being held tightly against the inner side 37 of the lug so that the trigger is held firmly in the position illustrated in FIG. 1. The vertical positioning of the trigger assembly is a matter of choice but is preferably approximately half way along the members 17.

The lug 36 is formed preferably by making a pair of spaced and parallel cuts from the end 34 inwardly and then bending down the portion of the metal therebetween to form a trigger plate 38 shown in FIGS. 2, 3 and 4. This extends downwardly at right angles and the outer face 39 bears against the inner side 40' of the member 17 of one of the upper jaws 15.

A secondary plate 40 is welded to the main plate 33 and extends substantially at right angles upon each side thereof thus forming a cruciform trigger plate assembly. The portions of the secondary plate 40 beyond the confines of the main plate 33 are bent downwardly slightly to ensure that the transverse members 18 of the upper jaws, clear the trigger assembly when the trap is sprung.

In operation, the spring is compressed to the position shown in FIG. 1 and the spring safety catch is engaged as illustrated. The two upper jaw frames 15 are then moved to the position substantially perpendicular to the base frame or jaws 10 whereupon the trigger assembly is positioned as illustrated and the spring safety catch removed thus firmly holding the trigger assembly in the cantilever position illustrated in FIG. 1.

Release of the trap is by movement of the trigger assembly in a plane substantially parallel to the base frame around the pivot formed by the engagement of the trigger assembly with the vertical member 17 or by downward movment of any portion of the trigger assembly including the secondary plate 40 or the inwardly extending portion 41 of the main plate 33. This downward movement causes the trigger plate to bear against the inner surface 40' and pivot the trigger assembly inwardly so that the lug disengages from the member 17 thus allowing the spring to urge the frames outwardly from one another and to the sprung position illustrated in FIG. 5.

This trap represents the two-fold improvement over the leg trap arrangement inasmuch as it provides a more efficient catch by means of its action and secondly, the lower jaws or frame are rigid and fixed therefore providing a base over which the hinged upper jaws must close when the trap is sprung.

The downward movement of the upper jaws affords an efficient catch as the jaw motion is directly opposite to an animal's line of retreat.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An animal trap comprising in combination a lower jaw assembly, an upper jaw assembly pivoted to said lower jaw assembly and movable from a set position substantially perpendicular to said lower jaw assembly, to a sprung position substantially superimposed upon said lower jaw assembly and vice versa, spring means operatively connected between said upper and lower jaw assemblies normally urging said upper jaw assembly towards the sprung position, and a trigger assembly for said upper jaw assembly, said trigger assembly maintaining said upper jaw assembly in the set position against the pressure of said spring means, when in the set position, and releasing said upper jaw assembly to the sprung position when disengaged from said upper jaw assembly, said upper jaw assembly including a pair of upper jaws each having lower ends and pivoted by said lower ends thereof substantially centrally of said lower jaw assembly and lying in substantially spaced and parallel relationship when in said set position, each of said upper jaws comprising an open rectangular frame, each of said open rectangular frames constituting said upper jaws including a pair of spaced and parallel side members including outer ends and a transversely extending end member extending between the outer ends of said side members, said trigger assembly including a main, substantially rectangular, member loosely pivoted at one longitudinal side thereof and adjacent one end thereof, to one of said side members of one of said open frames, a lug formed on said one end of said main member of said trigger assembly on the other longitudinal side member thereof and detachably engaging with the corresponding one side member of the other of said open frames when in the set position, and a trigger plate extending downwardly at right angles from said one end of said main member and engaging the corresponding one side members of said rectangular frames, and a secondary member extending from each side of said main member of said trigger assembly intermediate the ends thereof and substantially at right angles thereto, said spring means urging said corresponding side member into detachable locking engagement with said lug.

2. In an animal trap including a lower jaw assembly, an upper jaw assembly pivoted to said lower jaw assembly and movable from a set position substantially perpendicular to said lower jaw assembly, to a sprung position substantially superimposed upon said lower jaw assembly and vice versa, spring means operatively connected between said upper and lower jaw assemblies normally urging said upper jaw assembly towards the sprung position, said upper jaw assembly including a pair of upper jaws each having lower ends and pivoted by said lower ends thereof substantially centrally of said lower jaw assembly and lying in substantially spaced and parallel relationship when in said set position, each of said upper jaws comprising an open rectangular frame, each of said open rectangular frames including a pair of spaced and parallel side members including outer ends and a transversely extending end member extending between said outer ends of said side members; the improvement comprising a trigger assembly for said upper jaw assembly, said trigger assembly maintaining said upper jaw assembly in the set position against the pressure of the spring means when in the set position, and releasing said upper jaw assembly to the sprung position when disengaged from said upper jaw assembly, said trigger assembly including a main, substantially rectangular member loosely pivoted at one longitudinal side thereof and adjacent one end thereof, to one of said side members of one of said open frames, a lug formed on said one end of said main member of said trigger assembly on the other longitudinal side thereof and detachably engaging with the corresponding one side member of the other of said open frames when in the set position, a trigger plate extending downwardly at right angles from said one end of said main member and engaging the corresponding one side members of said rectangular frames, and a secondary member extending from each side of said main member of said trigger assembly intermediate the ends thereof and substantially at right angles thereto, said spring means urging said corresponding side member into detachable locking engagement with said lug.

3. The trap according to claim 1 in which said lower jaw assembly comprises a substantially rectangular open frame.

4. The trap according to claim 3 in which said transversely extending end members of said frames of said upper jaws are situated beyond the ends of said lower open frames when in the sprung position.

5. The trap according to claim 3 in which said spring means comprises a hair pin type spring assembly including a spring coil at one end thereof, a pair of arms extending one from each end of said spring coil, said spring coil normally urging said arms apart, means on the distal ends of said arms freely surrounding one longitudinal side of said open frame constituting said lower jaw assembly and being freely engaged between said substantially rectangular open frames constituting said upper jaw assembly.

6. The trap according to claim 4 in which said spring means comprises a hair pin type spring assembly including a spring coil at one end thereof, a pair of arms extending one from each end of said spring coil, said spring coil normally urging said arms apart, means on the distal ends of said arms freely surrounding one longitudinal side of said open frame constituting said lower jaw assembly and being freely engaged between said substantially rectangular open frames constituting said upper jaw assembly.

* * * * *